(12) United States Patent
Sattamini (10) Patent No.: US 9,731,792 B2
(45) Date of Patent: Aug. 15, 2017

(54) ERGONOMIC DUAL SHIFTER ASSEMBLY

(71) Applicant: Jose Sattamini, East Stroudsburg, PA (US)

(72) Inventor: Jose Sattamini, East Stroudsburg, PA (US)

( * ) Notice: Subject to any disclaimer, the term of this patent is extended or adjusted under 35 U.S.C. 154(b) by 354 days.

(21) Appl. No.: 14/587,794

(22) Filed: Dec. 31, 2014

(65) Prior Publication Data

US 2016/0114860 A1 Apr. 28, 2016

Related U.S. Application Data

(60) Provisional application No. 62/067,348, filed on Oct. 22, 2014.

(51) Int. Cl.
| | | |
|---|---|---|
| *B62M 25/06* | (2006.01) | |
| *G05G 1/34* | (2008.04) | |
| *G05G 1/40* | (2008.04) | |
| *B62K 23/08* | (2006.01) | |

(52) U.S. Cl.
CPC ............. *B62M 25/06* (2013.01); *B62K 23/08* (2013.01); *G05G 1/34* (2013.01); *G05G 1/40* (2013.01)

(58) Field of Classification Search
CPC ............ B62M 25/06; G05G 1/40; G05G 1/34
See application file for complete search history.

(56) References Cited

U.S. PATENT DOCUMENTS

| | | | | |
|---|---|---|---|---|
| 3,919,896 A | * | 11/1975 | Foster | B62K 23/08 180/225 |
| 2006/0027410 A1 | * | 2/2006 | Graziano | B62K 23/08 180/230 |
| 2008/0295641 A1 | * | 12/2008 | Suzuki | B62J 25/00 74/594.4 |
| 2009/0090578 A1 | * | 4/2009 | Ross | B62M 25/06 180/364 |
| 2009/0255360 A1 | * | 10/2009 | Witteveen | B62K 23/08 74/473.16 |
| 2009/0272215 A1 | * | 11/2009 | Plackis | B62K 23/08 74/473.16 |

* cited by examiner

*Primary Examiner* — Terence Boes (57) ABSTRACT

Described herein are gear shifter interfaces for a motor vehicle comprising: a shifter assembly configured to connect to a shift lever comprising: a first plate having a top surface and a bottom surface; a first peg attached to the first plate; a second plate slidably coupled to the first plate, wherein the second plate has a top surface and a bottom surface; and a second peg attached to the second plate.

19 Claims, 12 Drawing Sheets

ERGONOMIC DUAL SHIFTER ASSEMBLY

CROSS-REFERENCE TO RELATED PATENT APPLICATIONS

This application claims the benefit of U.S. Provisional Application Ser. No. 62/067,348, filed Oct. 22, 2014, entitled "Enhance Ergonomic Dual Shifter Assembly for Motorcycles with Dynamic Revolving Pegs" and; and also claims the benefit of U.S. Nonprovisional application Ser. No. 14/469,576, filed Aug. 26, 2014, entitled "Ergonomic Dual Shifter Assembly for Motorcycles with Dynamic Revolving Pegs", the entireties of which are hereby incorporated herein by reference.

FIELD OF THE DISCLOSURE

The present invention relates to an enhanced mechanism for shifting gears in motorcycles and, more specifically, to a multi-adjustable dual shifter for motorcycles.

BACKGROUND

Motorcycles have sequential gearboxes, in which the gears are in the following sequence: 1st gear, neutral, 2nd gear, 3rd gear, 4th gear, etc. from bottom to top or, in some cases, in reverse sequence from top to bottom. Coupled to the gearbox is a conventional peg shifter operated by a foot of an operator of the motorcycle. When the peg is pulled up by the operator, the gear box shifts to a higher gear. When the peg is pushed down by the operator, the gear box shifts to a lower gear.

Operation of the peg shifter requires the conductor of the motorcycle to constantly change the position of his foot from below to above the shifting peg, and vice versa, to respectively shift the gears up and down. Such movement requires adequate ankle articulation and training to control the shifting peg properly. The motorcycle having the conventional shifting peg is limited in its form, design, and function, as it requires the operator to adapt his body to the machine. The machine is not adjustable to ergonomically adapt to the body, position, size and capabilities of said conductor. The inconvenience of shifting a traditional shifter slows shifting and can make a difference in a racing environment.

U.S. Pat. No. 3,919,896 (hereinafter "the '896 patent") is directed to a foot-actuated gearshift assembly for a motorcycle. The '896 patent describes several embodiments of the gearshift assembly. Each embodiment includes a foot pedal and a toe pedal. In one embodiment, these pedals are rigidly mounted to a unitary shift lever. The foot pedal is connected to the body of the unitary shift lever, and the toe pedal is connected to a support leg 21 integrally formed with the unitary shift lever and extending from the body of the unitary shift lever. In another embodiment, the toe pedal is connected to a movable support leg through a clamp and set screw. The movable support leg is movable relative to the body of the shift lever and adjustable in position with respect thereto. Loosening the setscrew allows the toe pedal to be moved relative to the shift lever. Tightening it locks the toe pedal's position.

U.S. Pat. No. 4,083,263 (hereinafter "the '263 patent") is directed to an adjustable stirrup type motorcycle shifter. The shifter includes a crank member extending lengthwise along the motorcycle. At the forward end of the crank member extends a leg extending approximately perpendicularly therefrom. The leg forms the equivalent of a toe shifting peg. At the bottom of the crank member there is formed a slot in which a foot shifting peg is disposed. The foot shifting peg is movable relative to the crank member within the slot. A nut is used to tighten the peg to lock its position. The position of the toe shifting peg is not adjustable.

The '896 and '263 patent disclose gearshift assemblies have limited adjustability. The '896 patent describes a gearshift assembly in which the toe pedal is adjustable, but the foot pedal is not. The '263 patent discloses a gearshift assembly in which the foot peg is adjustable but the lever (toe peg) is not. Furthermore, although the '263 patent provides for adjusting the distance between the leg and the foot peg, it does so at the expense of changing the distance between the foot peg and the resting foot peg. The result is that solving one problem (the distance between the lever and foot peg) creates another one (the distance between the foot peg and the resting foot peg).

SUMMARY

In some embodiments, the present invention provides a solution for equipping motorcycles with a dual peg shifter mechanism, in which each peg is ergonomically positioned for upshifting or downshifting.

In some embodiments, the assembly is designed in such way that it can be easily installed on virtually any motorcycle, working in perfect combination with existing shift levers, rods, rear sets, foot pegs, and forward controls, requiring minor or no modifications at all.

Traditional gear shift interfaces, such as those described in U.S. Pat. No. 4,083,263, are suitable for use with only one type of shift lever that extends itself from the foot peg toward the front and requires a complete assembly in order to accomplish limited effects. In stark contrast, the gear shifter interfaces of the present invention can be used with any existing shift lever, regardless of whether it projects from the rear to the front or from the front to the rear.

In addition, shifter pegs have traditionally been positioned right in the middle of (and obstructing) the "comfort zone", in order to perform two completely distinct functions —upshift and downshift. This not only affects comfort, but also greatly affects safety, as even an experienced motorcyclist may occasionally shift gears unintentionally. The use of a dual-peg gear shifter interface as provided by some embodiments of the present invention, wherein each peg is dedicated for a specific function, provides an unobstructed "comfort zone" and virtually eliminates unsafe, unintended gear shifts by the operator.

The present invention also overcomes certain safety hazards presented by traditional gear shifter interfaces. For example, prior art gear shifter interfaces retain the operator's foot—at least partially—inside the assembly, which increases the likelihood of the operator's foot being trapped inside the assembly; thereby increasing the risk of serious injury in an accident. Unlike the prior art gear shifter interfaces, embodiments of the present invention provide complete freedom of movement of the operator's foot at any given time. In fact, the shifter assembly does not in any way trap the foot of the operator, or stay "in the way" when not in use.

Additionally, embodiments of the present invention provide vast adjustment range to the operator, allowing the gear shifter interface to be positioned according to the most natural arrangement for each individual operator. The gear shifter interface also permits the operator to adjust the controls to its own unique anatomy and/or riding style of preference.

Moreover, by providing a more efficient way for shifting, gear shifter interface assemblies of the present invention also enhance safety, by allowing the operator to sharply and efficiently switch from downshifting to upshifting and vice-versa, saving seconds that could save his/her life.

In some embodiments, the present invention provide a gear shifter interface comprising a first plate and a second plate, each plate having a peg attached thereto, and aligned with one another by means of tracks (e.g. a groove and ridge mating assembly). In some embodiments, the tracks are configured to provide an unprecedented range of adjustment, which allows the assembly to be rotated and the distance between the two pegs to be either reduced or augmented.

Prior attempts to optimize the positioning and functionality of a second shift peg have been unsuccessful. For example, U.S. Pat. No. 3,919,896 reports a method of attaching a second shift peg to an existing shift lever. The '896 patent fails to describe a secure way of attaching a second shift peg to a shift lever, because it does not provide a solution for the non-optimal position of the existing peg (the downshift peg). The '896 patent also fails to compensate for the distance between the second shift peg and the resting foot peg; which in turn, makes upshifting more difficult by increasing the distance between the upshifting peg and the anchor/support point of the operator's foot, i.e. the resting foot peg.

To address the deficiencies in the prior art, the gear shifter interfaces of the present invention comprise two plates having a shape that spaces the two pegs in a radius, which maintains the natural relationship with the resting foot peg. This allows both pegs to be adjusted to fit an individual operator's needs, e.g. lowering the downshift peg and raising the upshift peg, while rotating the entire assembly.

In some embodiments, the spindle is static, and the sleeve rotates and revolves freely around the spindle. In some embodiments, the sleeve rotates around the spindle when it is contacted by the operator's foot/shoe.

In some embodiments, the plates of the shifter assembly are configured to connect to an existing shift lever, and are intended to replace the standard shift peg.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings.

DETAILED DESCRIPTION

In some embodiments, the present invention comprises two plates that are juxtaposed and flipped. In some embodiments, the plates are slotted and matched in a male/female "tongue and groove" type of arrangement that allows the plates to maintain alignments with each other, while also permitting continuous vertical semi-circular adjustment and spacing. In some embodiments, the plates are slotted in such a way that the dual plate combination can also be moved up or down in relation to the anchor/attachment point.

As used herein the term "interface" is intended to refer to the most external parts of the gear shifting mechanism which the operator uses to control the gear box.

In some embodiments, both plates comprise a means for attaching a peg. In some embodiments, the means for attaching a peg is a threaded hole. In other embodiments, the presence of a peg on each plate, allows the operator to avoid "fetching" for the shifter, and makes the dual peg system immediately available and properly positioned for both upshifting and downshifting.

In some embodiments, the plates can be connected and fastened to any existing shift lever with a long bolt (e.g. ⅝"-24 1" long bolt) and a flat washer. In these embodiments, the user can adjust the angle of the assembly and the distance between the two pegs, as well as the proximity of one peg or another to the resting foot peg, by simply releasing the bolt. By positioning the pegs in the optimal position for downshift and upshift, the force needed for operation is greatly reduced, because it is applied in the vectorial direction of the shift lever's movement, rather than at an angle.

In some embodiments, the gear shifter interfaces of the present invention can be easily attached to any existing ISO shift lever or to any shift lever with a minor modification, e.g. drilling a threaded hole to accept the assembly.

Some embodiments of the present invention provides a dynamic revolving peg. These pegs are inherently different than those traditionally available, since they are not solid and static. In some embodiments, the revolving peg comprises a spindle; a plurality of bearings; a sleeve and a retaining clip.

In some embodiments, the spindle comprises a tip configured to attach the spindle to the gear shifter interface assembly. In some embodiments, the tip is a threaded tip. In some embodiments, the tip forms the proximal end of the spindle. In some embodiments, the spindle is attached to plates; and a threaded tip serves as the anchor point. In some embodiments, the spindle further comprises a button-head. In some embodiments, the button-head forms the distal end of the spindle.

As used herein, the term "proximal end of the spindle" refers to the end of the spindle that is closer to the chassis of the motor vehicle. As used herein, the term "distal end of the spindle" refers to the end of the spindle opposite the proximal end.

In some embodiments, the spindle is configured to hold a plurality of bearings. In some embodiments, a first bearing is held at the proximal end of the spindle and a second bearing is held at the distal end of the spindle. In other embodiments, the revolving peg further comprises a c-clip groove type that keeps the inner bearing from traveling beyond its intended position towards the thread part of the spindle or the fascia of the plate, when attached to it.

In some embodiments, the bearings are mounted inside the inner part of the sleeve. In some embodiments, the sleeve has both its ends recessed and bored to accommodate and lock the bearings in place.

In some embodiments, the spindle is static, and the sleeve rotates and revolves freely around the spindle. In some embodiments, the sleeve rotates around the spindle when it is contacted by the operator's foot/shoe. By allowing the contact surface of the peg to move freely, the abrasion between peg and shoe is virtually eliminated, further reducing the force needed to actuate the gear shifting mechanism, also minimizing wear and tear on the shoe surface.

Some embodiments permit the operator to: 1) adjust the distance between pegs to accommodate different types of shoes; 2) adjust the angle of the assembly, allowing for comfortable and ergonomic positioning the his/her foot, to accommodate different shoe/feet sizes, regardless of other installed equipment such as forward controls, lowered seats and suspension and others that change the operator's body position, balance, and leg angle in reference to the shifter; 3) maintain a relaxed position during cruising, without having his/her foot trapped or partially retained in the assembly, yet being able to immediately shift gears either up or down; 4) minimal force required to operate the shifter mechanism; and use minimal range of motion at the ankle joint and minimal muscle engagement to operate the motorcycle, which allows for operators with limited range of motion to safely operate a motorcycle.

In some embodiments, the gear shifter interface assemblies of the present invention may or may not include a revolving peg. In other embodiments, the revolving pegs described herein can be attached directly to a shift lever. In further embodiments, the plates described herein can be used with any static ISO peg.

In some embodiments, the plates run inside an enclosure to a rack and pinion type of mechanism rather than being coupled through the use of a bolt. In such embodiments, the enclosure is secured to the shift lever, while a knob connected to the pinion moves the plates up or down, augmenting or diminishing the distance between pegs.

Still further embodiments provide a gear shifter interface wherein the plates use an enclosure with a press- or push-button mechanism in each side, one for each plate. This configuration permits on-the-fly adjustment of the distance between pegs, without the need for tools.

In some embodiments, the present invention provides a dual-peg gear shifter interface assembly for motorcycles comprised of two plates with male/female grooves and slots, wherein the plates are configured to provide spacing adjustment while maintaining alignment with each other; and wherein the distance to the resting foot peg can be preserved or adjusted. In some embodiments, the plates support two dynamic pegs, wherein the pegs are mounted on bearings, and wherein one dynamic peg is configured for downshifting, and the second dynamic peg is configured for upshifting.

In some embodiments, the plates can be attached to any existing shift lever, becoming part-and-parcel of the motorcycle existing mechanism, regardless of direction of shift lever or direction of gear sequence.

In some embodiments, the plates are configured to permit adjustment of the distance of the pegs attached to each plate, which provides an unprecedented range of ergonomic customization to adapt to and accommodate different anatomies of riders (e.g. shoe and leg size, leg angle and length), different shoe styles, different motorcycles, and existing shift levers, rods and rear sets.

In some embodiments, the ability to adjust the distance between the pegs and permit optimal positioning and individual adjustment of downshift and upshift dedicated pegs, while maintaining safe clearance to keep an operator's foot completely free and prevent trapping in all situations.

In some embodiments, the plates are configured to reduce the timing necessary for shifting gears. In some embodiments, the plates are configured to reduce the time required to switch from upshifting to downshifting and vice-versa.

In some embodiments, the sleeve of the revolving peg rolls freely when contacted with an operator's foot, thereby reducing the force necessary to actuate the shift lever; which in turn, reduces fatigue and wear and tear on shoes.

In some embodiments, the gear shifter interface assembly of the present invention reduces muscle engagement and range of motion at the ankle articulation necessary for gear shifting, allowing for individuals with limited range of motion to safely and comfortably operate a motorcycle.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

Figure 1:
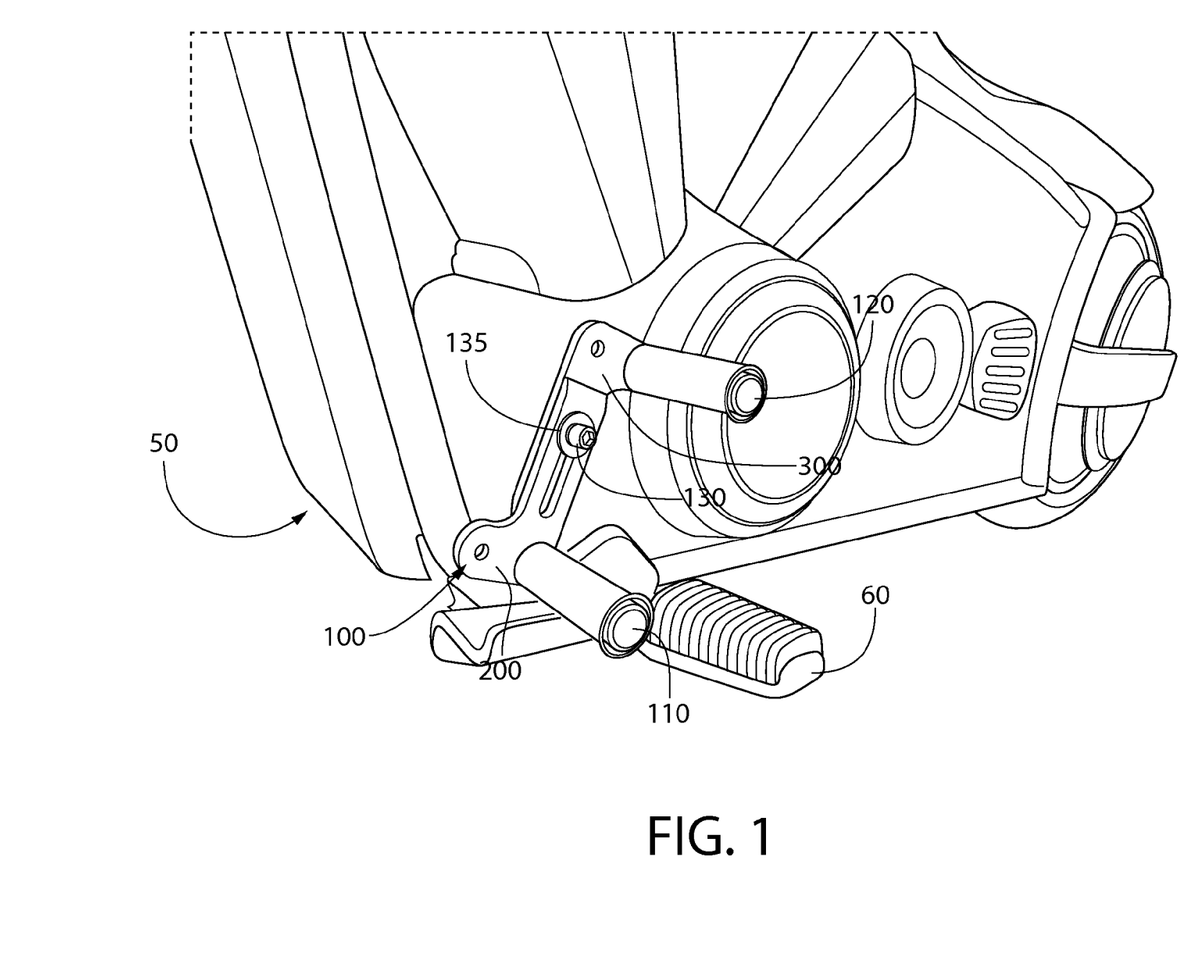
FIG. 1 depicts an adjustable shifting lever attached to a motorcycle, the adjustable shifter assembly comprising a first plate and a second plate, in accordance with an exemplary embodiment of the present invention.

Referring now to FIG. 1, there is illustrated an adjustable gear shifter interface assembly, generally designated as 100, for a motorcycle 50, in accordance with a first exemplary embodiment of the present invention. The adjustable shifter assembly 100 comprises a first plate 200 and a second plate 300, which plates are adjustable with respect to one another. The adjustable shifter assembly 100 is attached to a shift lever 70 (illustrated in FIGS. 4-7) of the motorcycle 50 via a bolt 130 and a washer 135 which protects the adjustable shifter assembly 100 from being marred by the bolt 130. Connected to the first plate 200 of the adjustable shifter assembly 100 is foot peg 110, and connected to the second plate 300 of the adjustable shifter assembly 100 is a toe peg 120. The adjustable shifter assembly 100 and the shifting lever 70 together form a gear shifter interface for the motorcycle 50.

Figure 2:
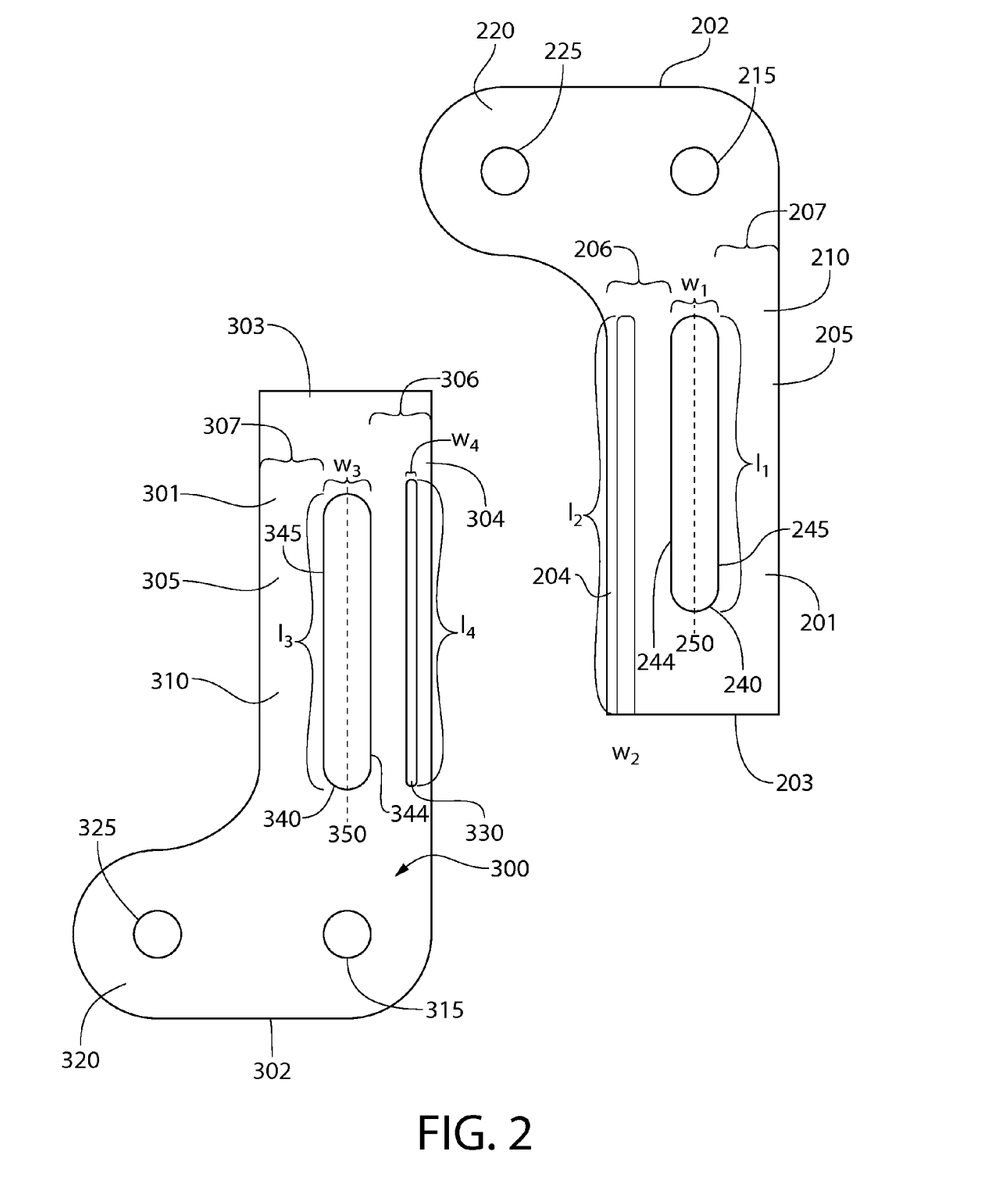
FIG. 2 depicts the first plate and the second plate of the adjustable shifter assembly of FIG. 1, the first plate and the second plate shown separated from one another, in accordance with an exemplary embodiment of the present invention.

Referring now to FIG. 2, there are illustrated the first plate 200 and the second plate 300 of the adjustable shifter assembly 100, in accordance with the first exemplary embodiment of the present invention. The first plate 200 comprises an inside surface 201, a body portion 210, and an arm 220 extending from the body portion 210 at a first end 202 of the body portion 210. Disposed in the arm 220 is a hole 225, and disposed in the body portion 210 at the first end 202 thereof is a hole 215. The holes 215 and 225 are sized to accept a bolt of the foot peg 110.

The second plate 300 comprises an outside surface 301, a body portion 310, and an arm 320 extended from the body portion 210 at a first (distal) end 302 of the body portion 302. Disposed in the arm 320 is a hole 325, and disposed in the body portion 310 at the first end 302 thereof is a hole 315. The holes 315 and 325 are sized to accept a bolt of the shifting peg 120.

The first plate 200 further comprises a slot 240, and the second plate 300 further comprises a slot 340. In the exemplary embodiment illustrated in FIG. 2, the slot 240 is bisected lengthwise along a center line 250 of the body 210 of the first plate 200, and the slot 340 is bisected lengthwise along a center line 350 of the body 310 of the second plate 300. The slot 240 has a width, $w_1$, and a length, $l_1$. The slot 340 has a width, $w_3$, and a length, $l_3$. The widths, $w_1$ and $w_3$, of the slots 240, 340 are sized to accept the bolt 130 (illustrated in FIG. 1) for securing the plates 200 and 300 to the shifting lever 70 of the motorcycle 50.

The inside surface 201 of the body portion 210 of the first plate 200 comprises an anterior side 206 and a posterior side 207. The outside surface 301 of the body portion 310 of the second plate 300 comprises an anterior side 306 and a posterior side 307. The body portion 210 further comprises an anterior edge 204 and a posterior edge 205, and the body portion 310 further comprises an anterior edge 304 and a posterior edge 305. The slot 240 further comprises an anterior edge 244 and a posterior edge 245, and the slot 340 further comprises an anterior edge 345 and a posterior edge 345. The distance between the edges 244 and 245 comprises the width $w_1$, and the distance between the edges 344 and 345 comprises the width $w_3$.

As used herein, the terms "anterior" and "posterior" are intended to be with reference to the front and back, respectively, of the motorcycle 50.

As used herein, the term "inside" is intended to convey that the surface 201 faces toward the motorcycle 50 when the adjustable shifter assembly 100 is installed on the motorcycle 50; and the term "outside" is intended to convey that the surface 301 faces away from the motorcycle 50 when the adjustable shifter assembly 100 is installed on the motorcycle 50.

Disposed in the body 210 on the anterior side 206 of the inside surface 201 of the plate 200 is a longitudinal groove 230. The groove 230 is disposed in the body 210 of the plate 200 parallel to the slot 240. Disposed in the body 310 on the anterior side 306 of the outside surface 301 of the plate 300 is a ridge 330. The ridge 330 is disposed on the body 310 of the plate 300 parallel to the slot 340. In an exemplary embodiment, the longitudinal groove is disposed equidistant from the anterior edge 204 of the body 210 and the anterior edge 244 of the slot 240, and the longitudinal ridge 330 is disposed equidistant from the anterior edge 304 of the body 310 and the anterior edge 344 of the slot 340.

The groove 230 has a width, $w_2$, and a length, $l_2$, and the ridge 330 has a width, $w_4$, and a length, $l_4$. The width, $w_2$, is slightly greater than width, $w_4$, to allow the ridge 330 to slide longitudinally in the groove 230. The length, $l_2$, is greater than the length, $l_4$, to allow for a sufficient amount of translation of the plate 200 relative to the plate 300 to allow for a sufficient amount of translation of the plate 200 relative to the plate 300 to provide for a range of adjustment suitable for contemplated operators of the motorcycle 50. In an exemplary embodiment, the length, $l_2$, is greater than the length, $l_4$, by about 30%. It is to be understood that a range of 25% to 75% by which the length, $l_2$, is greater than the length, $l_4$, is contemplated.

Figure 3:
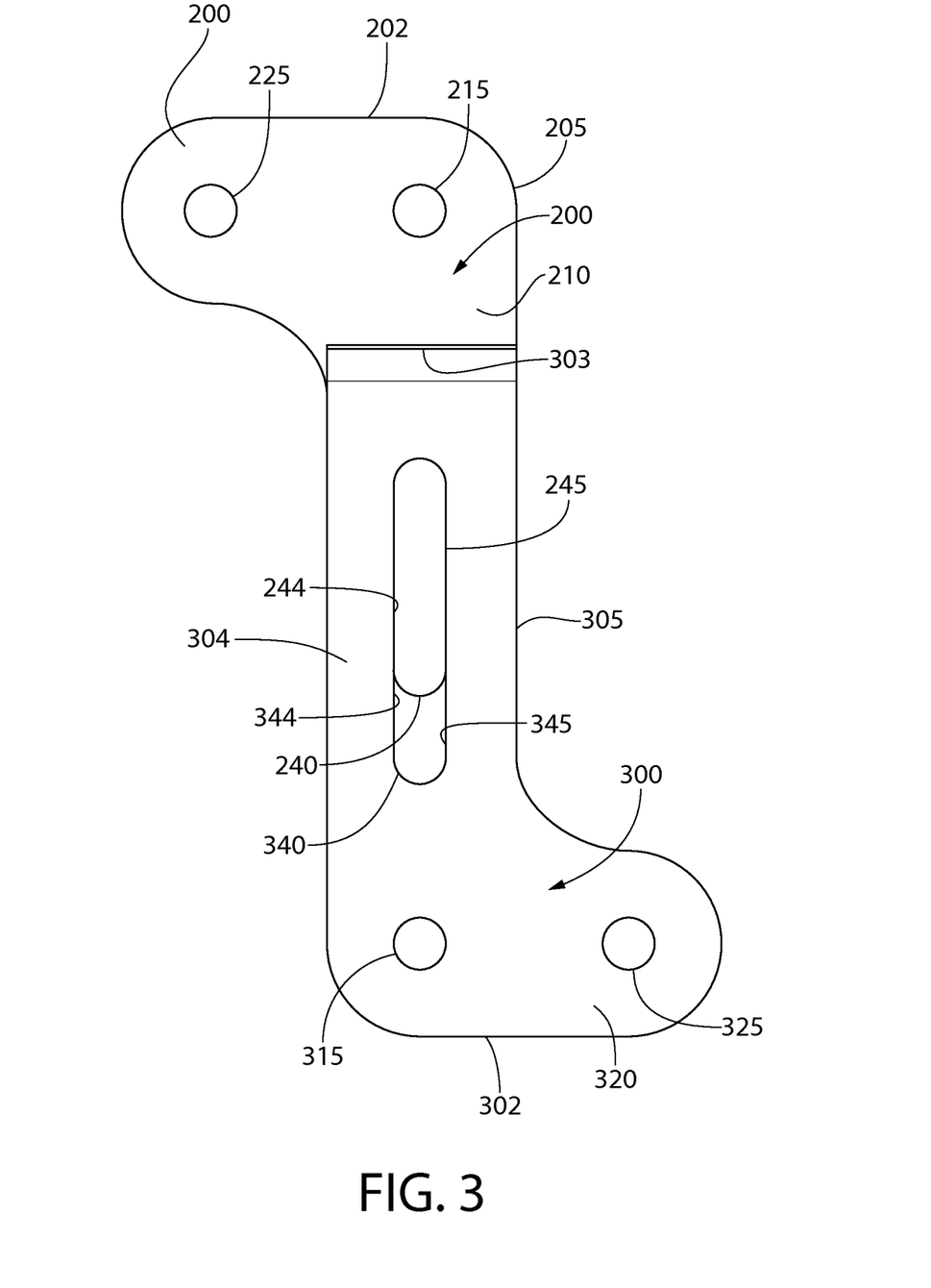
FIG. 3 depicts the first plate and the second plate of the adjustable shifter assembly of FIG. 1, the first plate and the second plate shown mated together, in accordance with an exemplary embodiment of the present invention.
Figure 4:
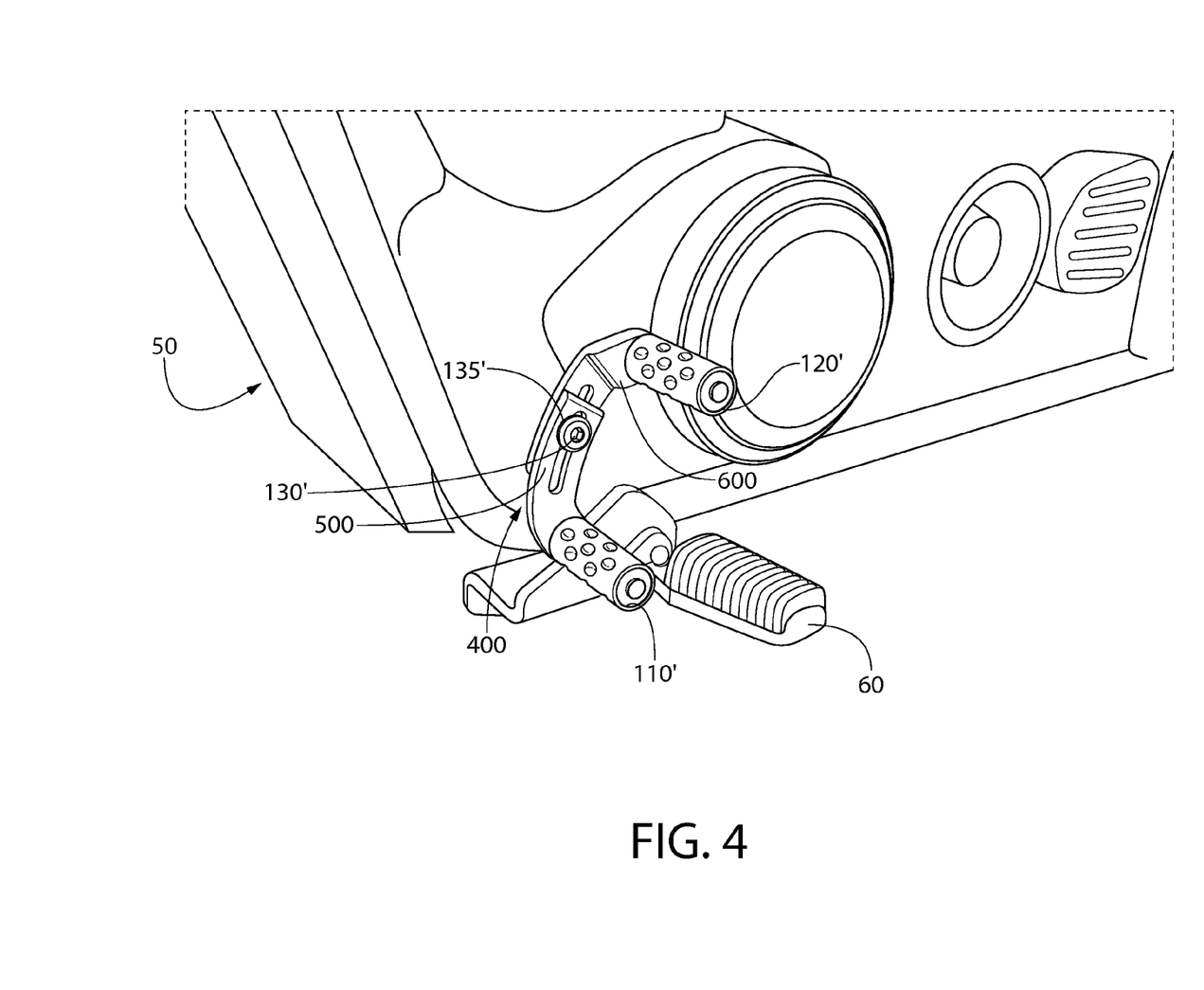
FIGS. 4-7 depict an adjustable shifter assembly attached to the motorcycle of FIG. 1, the adjustable shifter assembly comprising a first plate and a second plate, in accordance with a second embodiment of the present invention.
Figure 5:
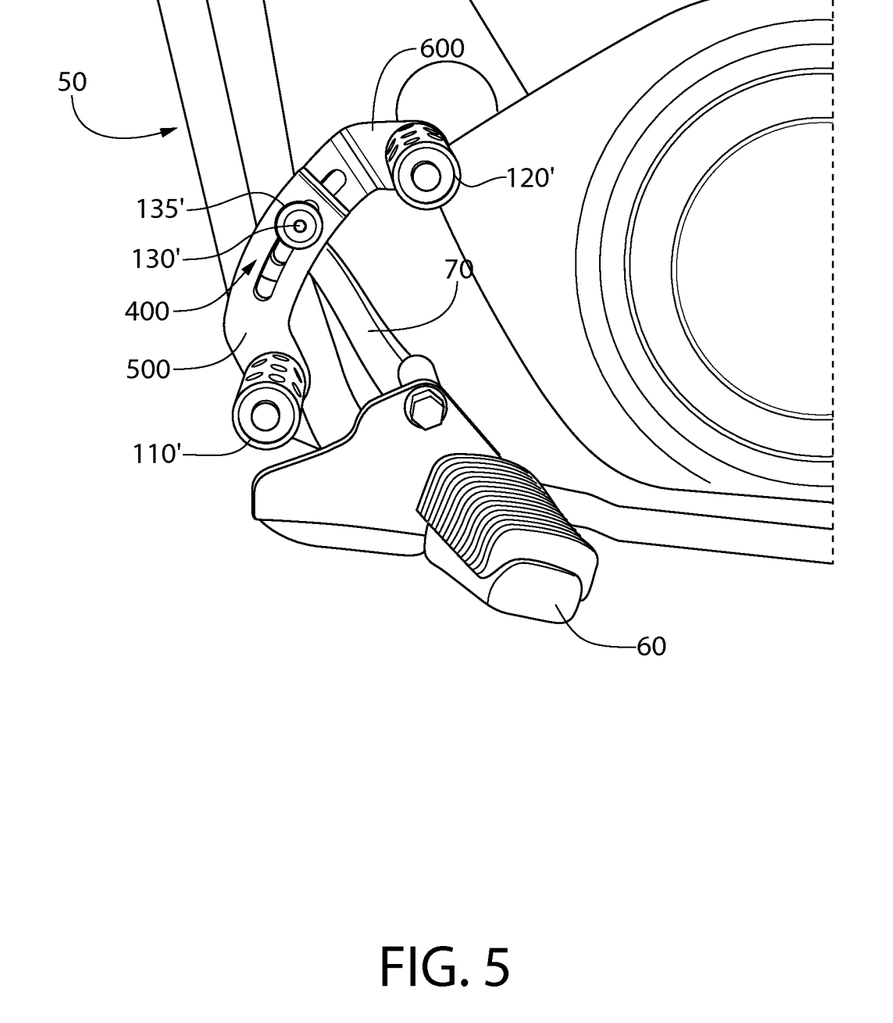

Referring now to FIG. 3, there are illustrated the plates 200 and 300 of the adjustable shifter assembly 100, in accordance with an exemplary embodiment of the present invention. The plates 200 and 300 are illustrated mated together, such that the ridge 330 is slidably disposed in the groove 230. Their position with respect to one another is fixed when the bolt 130 is tightened to the shifting lever 70 of the motorcycle.

The holes 215 and 225 of the plate 200 are threaded for attaching peg 110, and the holes 315 and 325 of the plate 300 are threaded for attaching the peg 120. In an exemplary embodiment, the threads are 5/16"-24, which is the standard ISO measure for such applications.

By attaching one peg 110, 120 to each plate 200 and 300, the operator of the motorcycle 50 no longer has to "fetch" for a shifter. Instead, for both upshifting and downshifting, the adjustable shifter assembly 100 provides for adjustable positioning of the pegs 110 and 120.

Thus, each of the pegs 110 and 120 is immediately available and properly positioned for shifting. In an exemplary embodiment, the bolt 130 is a 5/16 inch by 24 1 inch long bolt, and the washer 135 is a flat washer. By loosening the bolt 135 just enough from the shift lever 70, the operator can adjust the linear displacement of the plate 200 relative to the plate 300 and, therefore, the distance between the two pegs 110 and 120.

In the exemplary embodiment of the adjustable shifter assembly 100 described herein, the edges 244 and 245 of the slot 240 and an anterior edge 234 and a posterior edge 235 of the groove 230 are linear, and the edges 344 and 345 of the slot 340 and an anterior edge 334 and a posterior edge 335 of the ridge 330 are linear. Thus, translation of the plates 200 and 300 with respect to one another is linear. Such translation allows the operator of the motorcycle to adjust a distance between the pegs 110 and 120 to accommodate a size of a foot of the operator. As discussed, above, adjustment takes plate when the bolt 130 is loosened with respect to the plates 200 and 300. When the adjustment is complete, the bolt 130 is tightened to secure the plates 200 and 300 to the shifting lever 70 and to secure the plates 200 and 300 in place relative to one another.

Illustrated in FIGS. 4-7 are perspective, side, top, and rear views of an adjustable shifter assembly, generally designated as 400, for the motorcycle 50, in accordance with a second exemplary embodiment of the present invention. The adjustable shifter assembly 400 comprises a first plate 500 and a second plate 600, which plates are adjustable with respect to one another. The adjustable shifter assembly 400 is attached to the shifting lever 70 of the motorcycle 50 via a bolt 130' and washer 135'. The adjustable shifter assembly 400 and the shifting lever 70 together form a gear shifter interface for the motorcycle 50.

Figure 6:
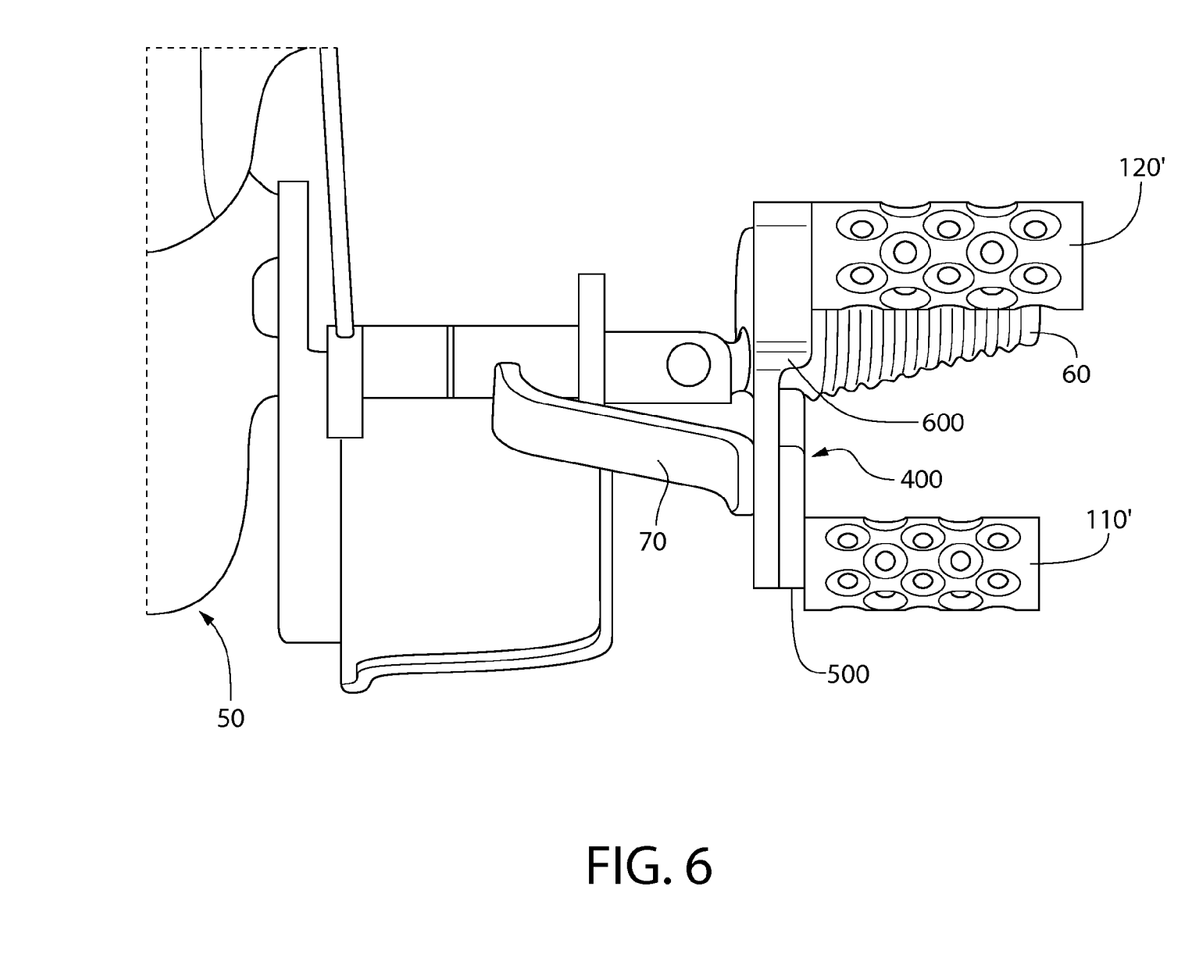
Figure 7:
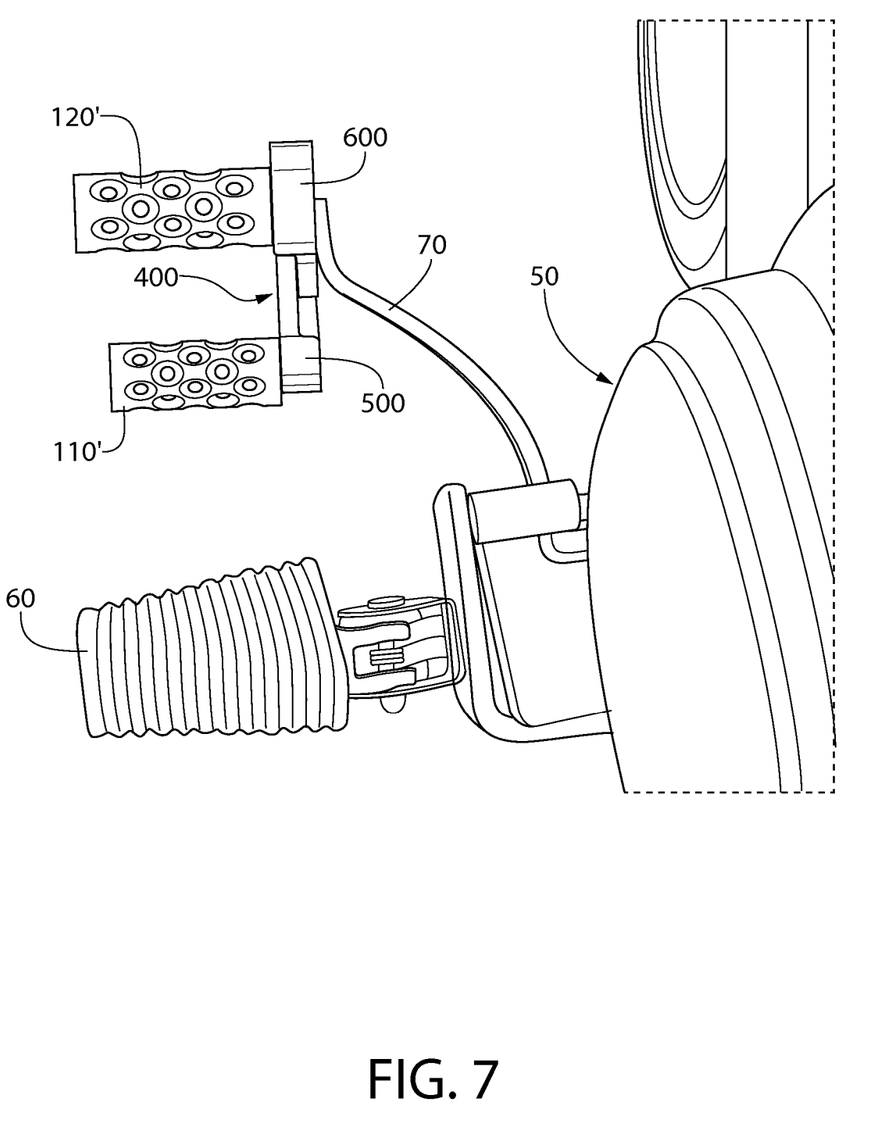
Figure 8:
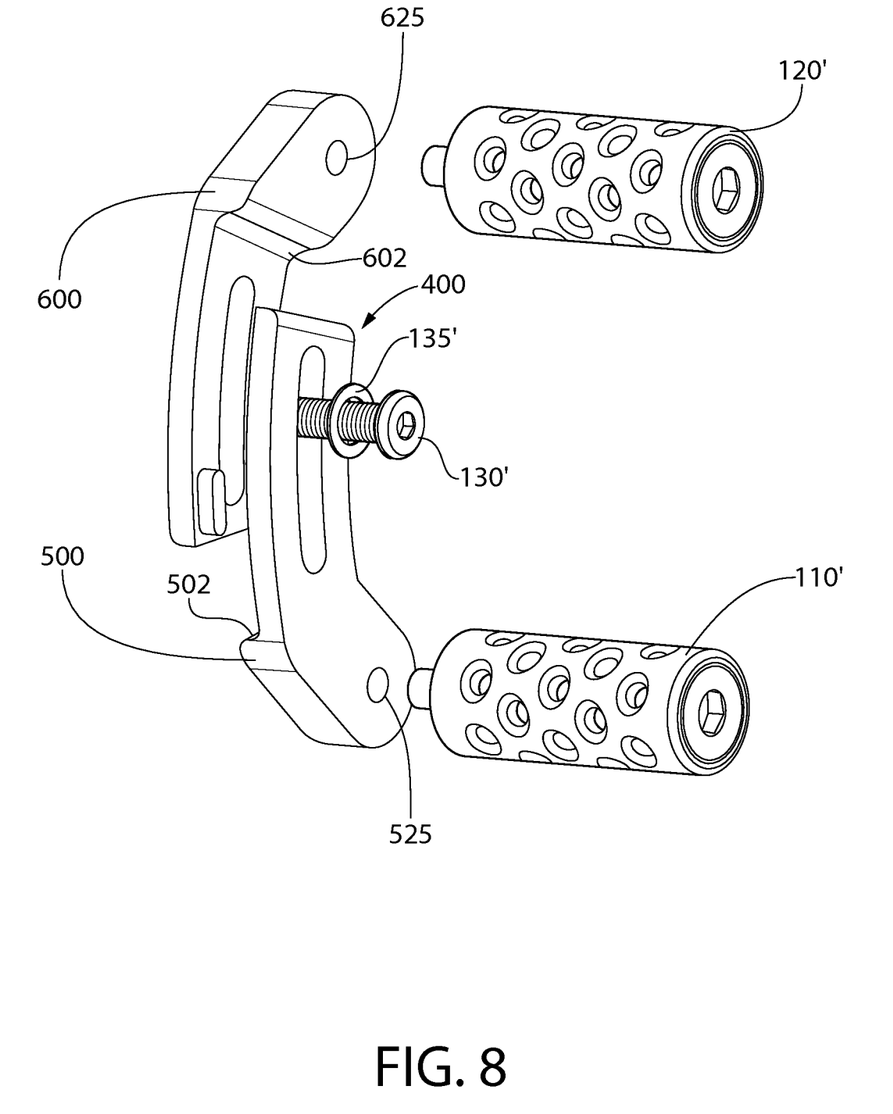
FIG. 8 depicts an exploded view of the adjustable shifter assembly of FIGS. 4-7, toe and foot shifting pegs, and a bolt and washer for attaching the adjustable shifter assembly to the motorcycle illustrated in FIG. 1, in accordance with an exemplary embodiment of the present invention.

FIG. 8 illustrates an exploded view of the adjustable shifter assembly 400 and specifically the first plate 500 and the second plate 600, in accordance with the second exemplary embodiment of the present invention. FIG. 6 illustrates a view of the first and second plates 500 and 600 separated from one another and facing away from one another, and FIG. 7 illustrates a view of the first and second plates 500 and 600 separated from one another but facing toward one another, in accordance with an exemplary embodiment of the present invention.

Figure 9:
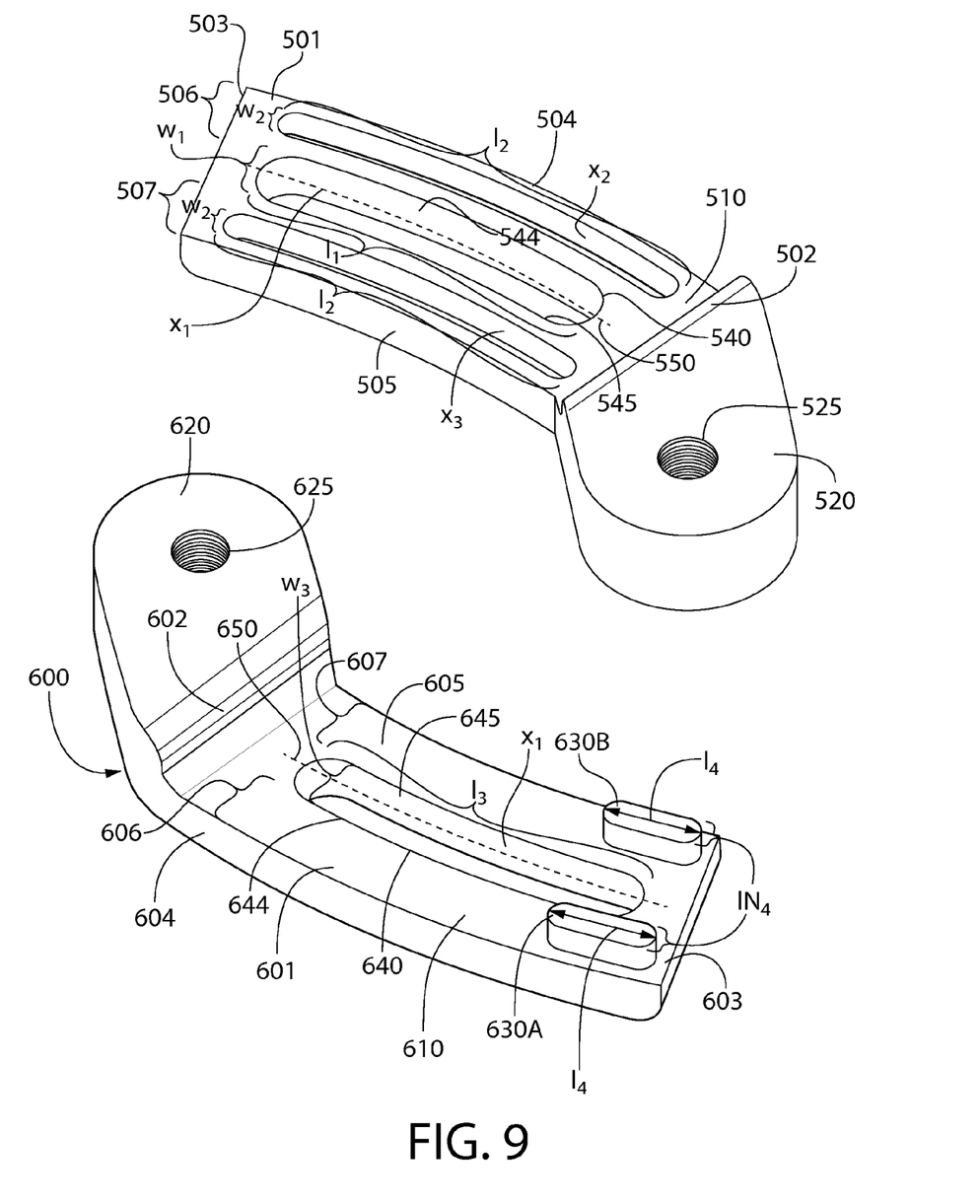
FIG. 9 depicts the first plate and the second plate of the adjustable shifter assembly of FIGS. 4-7, the first plate and the second plate shown separated from one another and facing away from one another, in accordance with an exemplary embodiment of the present invention.
Figure 10:
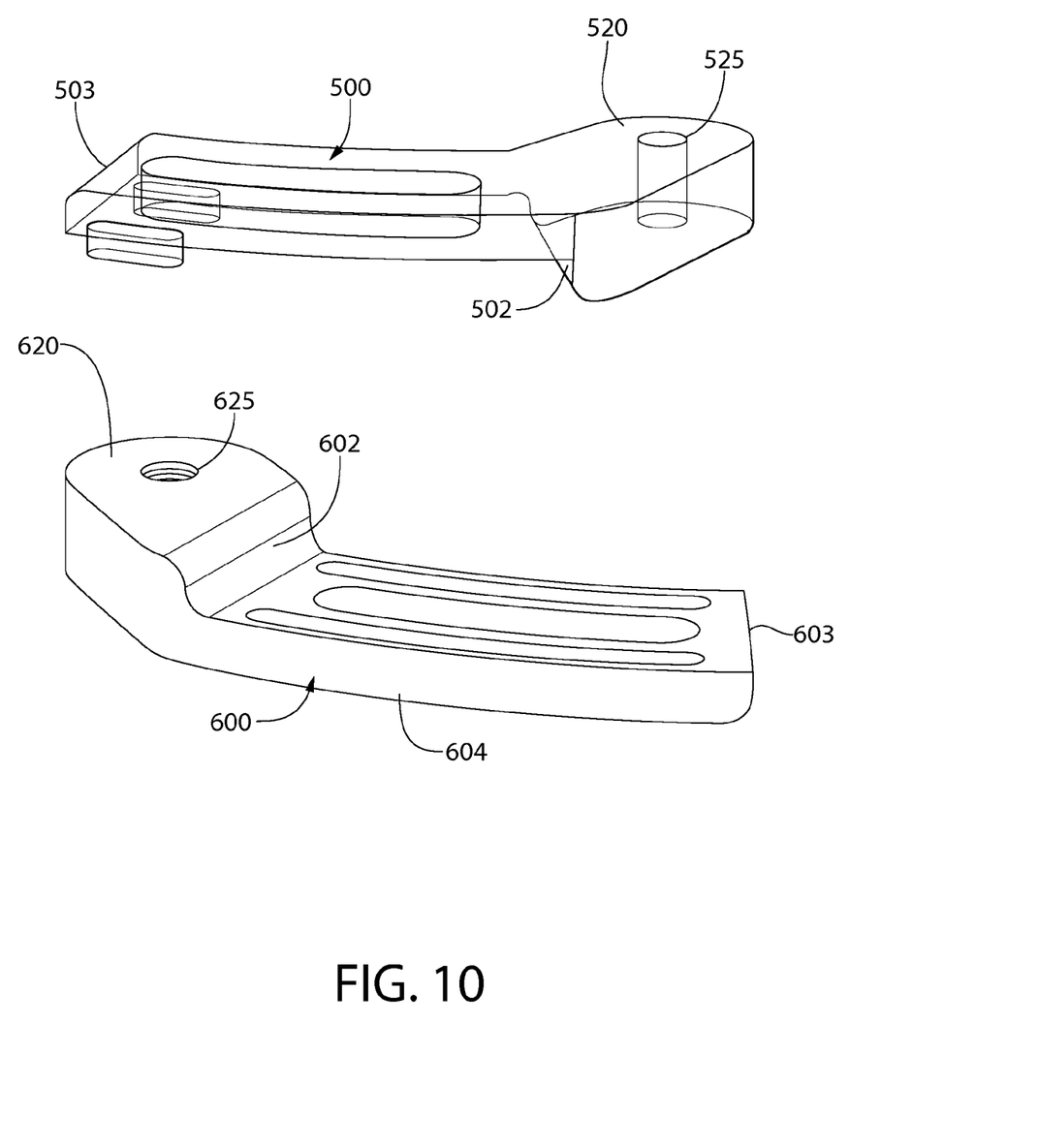
FIG. 10 depicts the first plate and the second plate of the adjustable shifter assembly of FIGS. 4-7, the first plate and the second plate shown separated from one another and facing toward one another, in accordance with an exemplary embodiment of the present invention.

Referring now to FIGS. 8-10, there are illustrated the first plate 500 and the second plate 600 of the adjustable shifter assembly 400, in accordance with the first exemplary embodiment of the present invention. The first plate 500 comprises an inside surface 501, a body portion 510, and an arm 520 extended from the body portion 510 at a first end 502 of the body portion 510. Disposed in the arm 520 is a hole 525. The hole 525 is sized to accept a bolt of the shifting peg 110'.

The second plate 600 comprises an inside surface 601, a body portion 610, and an arm 620 extended from the body portion 610 at a first end 602 of the body portion 602. Disposed in the arm 620 is a hole 625. The hole 625 is sized to accept a bolt of the shifting peg 120'.

The first plate 500 further comprises a slot 540, and the second plate 600 further comprises a slot 640. In the exemplary embodiment illustrated in FIG. 8, the slot 525 is bisected lengthwise along a center arc 550 of the first plate 500, and the slot 625 is bisected lengthwise along a center arc 650 of the second plate 600. The slot 540 has a width, $w_1$, and a length, $l_1$.

The slot 640 has a width, $w_3$, and a length, $l_3$. The widths, $w_2$ and $w_3$, of the slots 540, 640 are sized to accept the bolt 130' for securing the plates 500 and 600 to the shifting lever 70 of the motorcycle 50. The center arcs 550 and 650 each have a radius of $\alpha_1$. The center of the groove 530A follows an arc of radius $\alpha_2$. The center of the groove 530B follows an arc of radius $\alpha_3$. In an exemplary embodiment, the ridges 630A and 630B are linear, and their widths, $w_4$, are such that they may translate within the grooves 530A and 530B without binding. In another exemplary embodiment, the centers of the ridges 630A and 630B are curved and have respective radiuses $\alpha_2$ and $\alpha_3$. In yet another exemplary embodiment, the center of each of the radiuses $\alpha_1$, $\alpha_2$, and $\alpha_3$ is the resting foot peg 60 of the motorcycle.

The inside surface 501 of the body portion 510 of the first plate 500 comprises an anterior side 506 and a posterior side 507. The outside surface 601 of the body portion 610 of the second plate 600 comprises an anterior side 606 and a posterior side 607. The body portion 510 further comprises an anterior edge 504 and a posterior edge 505, and the body portion 610 further comprises an anterior edge 604 and a posterior edge 605. The slot 540 further comprises an anterior edge 544 and a posterior edge 545, and the slot 640 further comprises an anterior edge 645 and a posterior edge 645. The distance between the edges 544 and 545 comprises the width $w_1$, and the distance between the edges 644 and 645 comprises the width $w_3$. As discussed above, "anterior" and "posterior" are intended to be with reference to the front and back, respectively, of the motorcycle 50; "inside" is intended to convey that the surface 501 faces toward the motorcycle 50 when the adjustable shifter assembly 100 is installed on the motorcycle 50; and "outside" is intended to convey that the surface 601 faces away from the motorcycle 50 when the adjustable shifter assembly 100 is installed on the motorcycle 50.

Disposed in the body 510 on the anterior side 506 of the inside surface 501 of the plate 500 is a curved, longitudinal groove 530A, and disposed in the body 510 on the posterior side 507 is a curved, longitudinal groove 530B. The grooves 530A and 530B are disposed in the body 510 of the plate 500 on either side of the slot 540 along most of the length of the body 510. Disposed in the body 610 on the anterior side 606 of the outside surface 601 of the plate 600 is a ridge 630A, and disposed in the body 610 on the posterior side 607 is a ridge 630B. The ridges 630A and 630B are disposed on the body 610 of the plate 600 near the edge 603 of the body 610. In an exemplary embodiment, each longitudinal groove 530A, 530B is disposed equidistant from edge 504, 505, respectively, of the body 510 and the edge 544, 545, respectively, of the slot 540, and each longitudinal ridge 630A, 630B is disposed equidistant from the edge 604, 605, respectively, of the body 610 and the edge 644, 645, respectively, of the slot 640.

The grooves 530A and 530B each have a width, $w_2$, and a length, $l_2$, and the ridges 630A and 630B each have a width, $w_4$, and a length, $l_4$. The width, $w_2$, is slightly greater than width, $w_4$, to allow the ridges 630A and 630B to slide longitudinally in the grooves 530A and 530B. The length, $l_2$, is greater than the length, $l_4$, to allow for a sufficient amount of translation of the plate 500 relative to the plate 600 to provide for a range of adjustment suitable for contemplated operators of the motorcycle 50. In an exemplary embodiment, the length, $l_2$, is greater than the length, $l_4$, by about 300%. It is to be understood that a range of 50% to 400% by which the length, $l_2$, is greater than the length, $l_4$, is contemplated.

The hole 525 of the plate 500 and the hole 625 of the plate 600 are each threaded for attaching the respective pegs 110' and 120'. In an exemplary embodiment, the threads are 5/16"-24, which is the standard ISO measure for such applications.

By attaching one peg 110' and 120' to each plate 500 and 600, the operator of the motorcycle 50 no longer has to "fetch" for a shifter. Instead, for both upshifting and downshifting, the adjustable shifter assembly 400 provides for adjustable positioning of the pegs 110' and 120'. Thus, each of the pegs 110' and 120' is immediately available and properly positioned for shifting.

In an exemplary embodiment, the bolt 130' is a 5/16 inch by 24 1 inch long bolt, and the washer 135' is a flat washer. By loosening the bolt 130' just enough from the shift lever 70, the operator can adjust the angle of the assembly 400 and the distance between the two pegs 110' and 120', as well as the proximity of one peg or another to the resting foot peg 60.

By having the pegs 110' and 120' placed at the optimum position for downshift and upshift, the force needed for their operation is greatly reduced, by means of applying the force in the most efficient vectorial direction of the shift lever movement, i.e., in a direction tangent to the circle traced by the shift lever 70. In an exemplary embodiment, the shift lever 70 is an existing ISO shift lever, although other embodiments in which this is not the case are contemplated. If the shift lever 70 is not an ISO shift lever, the hole in the shift lever 70 for accepting the bolt 130' may be drilled and threaded for accepting the bolt 130'.

Figure 11:
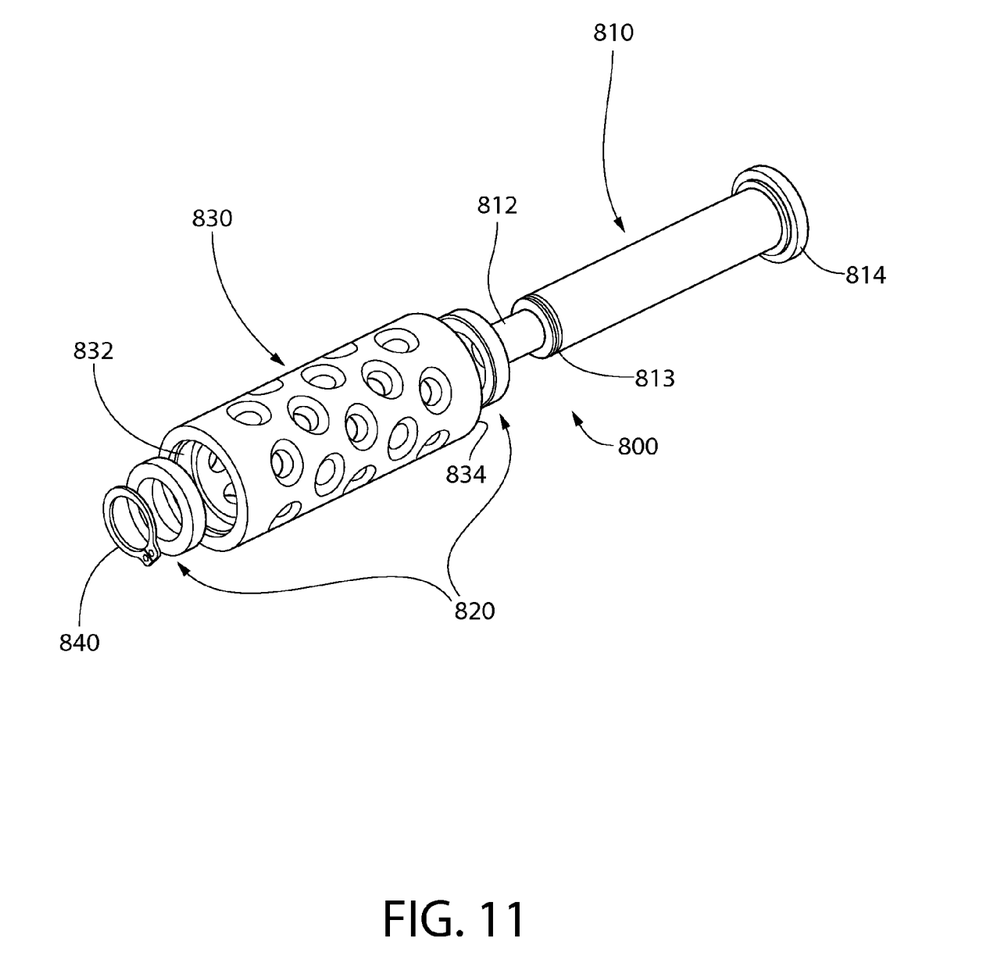
FIG. 11 depicts an exploded view of a single peg of an exemplary dual peg shifter assembly of the present invention.

Referring now to FIG. 11, there is illustrated an exemplary embodiment, generally designated as 800, of the pegs 110' and 120', in accordance with an exemplary embodiment of the present invention. It is to be understood that the peg 800 may be used in place of the pegs 110 and 120.

The peg 800 comprises a spindle/shaft 810, two bearings 820, a sleeve 830, and a retaining clip 840. The spindle 810 is equipped at one end with a threaded tip 812 (having threads of 5/16"-24) that will serve as anchor point to the plates 200, 300, 500, and 600, and at the other end, with a button-head type ending 814, with a 1/4" allen head drive for tightening the peg 800 to the plates 200, 300, 500, and 600.

The bearings 820 are disposed over the spindle 810, one bearing 820 at its outer (distal) end close to the button-head 814, and another at its inside (proximal) end adjacent to the threads 812. Adjacent to the threads 812 between the inner bearing 820 and the threads 812 is a groove 813 in the spindle 810. The retaining clip 840 is a c-clip that sits in the groove 813 to keep the inner bearing 820 from traveling beyond its intended position towards the threaded part 812 of the spindle 810 or to the surface 210, 310, 510, 610 of the respective plate 200, 300, 500, 600, when attached to it.

The sleeve 830 further comprises recesses 832 and 834 at its outside and inside ends, respectively. The recess 832 is sized to accommodate the outside bearing 820, and the recess 834 is sized to accommodate the inside bearing 820. The outside bearing 820 is held in place in the recess 834 by the button-head 814, and the inside bearing 820 is held in place in the recess 832 by the retaining clip 840.

When the threaded portion 812 is tightened against the plate 200, 300, 500, or 600, the spindle 810 is static, but the sleeve 830 freely rotates about the spindle 810 on the bearings 820. During operation, the operator's shoe causes the sleeve 830 to rotate when the foot is placed into position against the peg 800. This increases the ease of use of the peg 800 during operation. By allowing the contact surface of the peg 800 to move freely, the abrasion between peg 800 and the operator's shoe is greatly reduced, further reducing the force needed to actuate the gear shifting mechanism, while also minimizing wear and tear on the operator's shoe.

Figure 12:
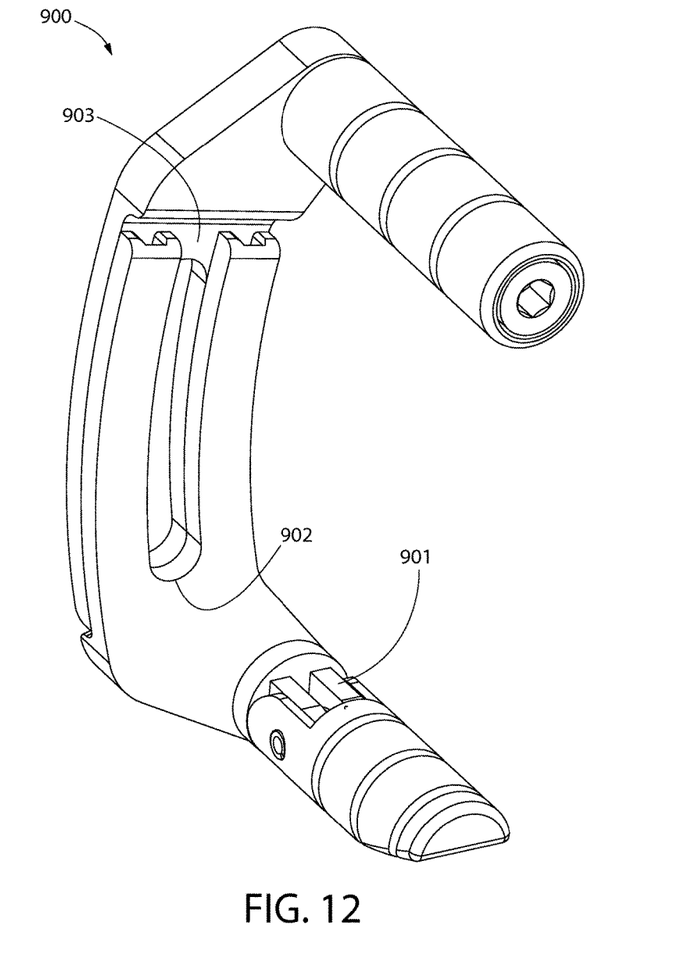
FIG. 12 depicts an additional embodiment of a gear shifter interface in accordance with the present invention.

As shown in FIG. 12, for example, some embodiments of the present invention provide a gear shifter interface 900 comprising a first plate having a top surface and a bottom surface, and a proximal end and a distal end; a first peg attached to the first plate; a second plate slidably coupled to the first plate, wherein the second plate has a top surface and a bottom surface, and proximal end and a distal end; and a second peg attached to the second plate, wherein the second peg is attached to the second plate by a hinge 901 or other means which permit the second peg to fold inward and upward to the second plate.

As used herein, the term "proximal end", when used in the context of the first plate and second plate, is intended to refer to the ends having edges 503, 603 of the body 510, 610, as depicted in FIG. 9.

As used herein, the term "distal end", when used in the context of the first plate and second plate, is intended to refer to the ends 202, 302 of the first plate 200 and second plate 300, as depicted in FIG. 3.

In some embodiments, the first plate comprises a first longitudinally disposed groove; and the second plate comprises a first longitudinally disposed ridge; wherein a width of the first longitudinally disposed groove is greater than a width of the first longitudinally disposed ridge. In some embodiments, the first longitudinally disposed groove is non-linear.

In some embodiments, the first plate comprises a second longitudinally disposed groove; and the second plate comprises a second longitudinally disposed ridge; wherein a width of the second groove is greater than a width of the second ridge.

In some embodiments, the second longitudinally disposed groove of the first plate is non-linear.

In some embodiments, the first plate further comprises a first slot configured to receive a bolt for coupling the first plate to the shifting lever; and the second plate further comprises a second slot configured to receive a bolt for coupling the second plate to the first plate. In some embodiments, the first slot is non-linear. In some embodiments, the second slot is non-linear. In some embodiments, the first slot comprises a curve having a third radius of curvature.

In some embodiments, the second slot has a fourth radius of curvature. In some embodiments, the first slot is linear, and the second slot is linear. In some embodiments, the proximal end of the first plate is coupled to the proximal end of the second plate. In some embodiments, the top surface of the first plate is coupled to the bottom surface of the second plate. In some embodiments, for example the embodiment depicted in FIG. 12, the longitudinally disposed groove of the second plate is open 903 at the proximal end of the second plate. In other embodiments, the longitudinally disposed groove of the second plate 902 has a horseshoe shape.

In some embodiments, the gear shifter interfaces of the present invention are configured for use with any motor vehicle that requires upshifting and downshifting. In some embodiments, the motor vehicle is selected from a motorcycle, a scooter, an all terrain vehicle and the like.

In some embodiments, the first plate comprises a material selected from aluminum; titanium; steel; and any other material that has suitable strength, durability and functionality required by the gear shifter interfaces of the present invention.

In some embodiments, the second plate comprises a material selected from aluminum; titanium; steel; and any other material that has suitable strength, durability and functionality required by the gear shifter interfaces of the present invention.

In some embodiments, the first plate and second plate comprise the same material. In some embodiments, the first plate and second plate comprise These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A gear shifter interface for a motor vehicle, the gear shifter interface comprising: a shifter assembly configured to connect to a shift lever, the shifter assembly comprising: a first plate having a top surface and a bottom surface, and a proximal end and a distal end; a first peg attached to the first plate; a second plate slidably coupled to the first plate, wherein the second plate has a top surface and a bottom surface, and a proximal end and a distal end; and a second peg attached to the second plate wherein:
   the first plate comprises a first longitudinally disposed groove; and
   the second plate comprises a first longitudinally disposed ridge;
   wherein a width of the first longitudinally disposed groove is greater than a width of the first longitudinally disposed ridge.

2. The gear shifter interface according to claim 1, wherein the first longitudinally disposed groove is non-linear.

3. The gear shifter interface according to claim 2, wherein the first longitudinally disposed groove comprises a curve having a first radius of curvature.

4. The gear shifter interface according to claim 1, wherein:
   the first plate further comprises a second longitudinally disposed groove; and
   the second plate further comprises a second longitudinally disposed ridge;
   wherein a width of the second groove is greater than a width of the second ridge.

5. The gear shifter interface according to claim 4, wherein the second longitudinally disposed groove of the first plate is non-linear.

6. The gear shifter interface according to claim 5, wherein the second longitudinally disposed groove of the first plate comprises a curve having a second radius of curvature.

7. The gear shifter interface according to claim 1, wherein:
the first plate further comprises a first slot configured to receive a bolt for coupling the first plate to the shifting lever; and
the second plate further comprises a first slot configured to receive a bolt for coupling the second plate to the first plate.

8. The gear shifter interface according to claim 7, wherein the first slot of the first plate is non-linear.

9. The gear shifter interface according to claim 8, wherein the first slot of the second plate is non-linear.

10. The gear shifter interface according to claim 1, wherein the first plate comprises a material selected from aluminum; titanium; steel; and a combination of two or more thereof.

11. The gear shifter interface according to claim 10, wherein the second plate comprises a material selected from aluminum; titanium; steel; and a combination of two or more thereof.

12. The gear shifter interface according to claim 1, wherein the first longitudinally disposed groove of the second plate is open at the proximal end of the second plate.

13. The gear shifter interface according to claim 12, wherein the first longitudinally disposed groove of the second plate has a horseshoe shape.

14. A rotatable shift peg for a motor vehicle, the rotatable shift peg comprising:
a spindle comprising a proximal end and a distal end;
a sleeve comprising a proximal end and a distal end, wherein the sleeve is coaxially aligned with the spindle;
a first bearing disposed at the proximal end of the spindle; and
a second bearing disposed at the distal end of the spindle.

15. The rotatable shift peg according to claim 14, wherein the sleeve is configured to rotate about the spindle.

16. The rotatable shift peg according to claim 15, wherein the first and second bearings are configured to provide rotational movement of the sleeve about the spindle.

17. The rotatable shift peg according to claim 14, further comprising a retaining clip configured to hold the first bearing at the proximal end of the spindle.

18. The rotatable shift peg according to claim 14, wherein the spindle further comprises a cap at its distal end, wherein the cap is configured to hold the second bearing at the distal end of the spindle.

19. The rotatable shift peg according to claim 14, wherein the spindle further comprises a thread portion adjacent to the proximal end of the spindle, the threaded portion configured for coupling with a shift lever of a motor vehicle.

* * * * *